US006596786B2

(12) United States Patent
Purvis et al.

(10) Patent No.: US 6,596,786 B2
(45) Date of Patent: Jul. 22, 2003

(54) RADIATION-CURABLE COATING COMPOSITION INCLUDING OLIGOMERIC PHOTOINITIATOR AND/OR OLIGOMERIC ADHESION PROMOTER

(75) Inventors: Michael B. Purvis, Hickory, NC (US); Igor V. Khudyakov, Hickory, NC (US); Bob Overton, Lenoir, NC (US); Todd W. Gantt, Catawba, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/931,417

(22) Filed: Aug. 17, 2001

(65) Prior Publication Data

US 2003/0045601 A1 Mar. 6, 2003

(51) Int. Cl.[7] .............................. C08F 2/46; G02B 6/00
(52) U.S. Cl. .......................... 522/35; 522/904; 522/99; 522/63; 522/68; 522/42; 522/41; 522/43; 522/44; 522/45; 522/46; 522/90; 522/96; 522/113; 522/116; 522/126; 522/127; 522/129; 522/130; 522/150; 522/152; 522/148; 428/378; 428/391; 428/394; 525/471; 525/153; 525/158; 385/147
(58) Field of Search .................. 522/905, 902, 522/99, 63, 68, 40–46, 35, 113, 90, 116, 96, 126, 127, 129, 130, 150, 152, 148; 525/471, 153, 158; 428/378, 391, 394; 385/147

(56) References Cited

U.S. PATENT DOCUMENTS

| 3,883,468 | A | * | 5/1975 | Schmidt et al. ............. 524/593 |
| 4,200,762 | A | | 4/1980 | Schmidle |
| 4,602,097 | A | * | 7/1986 | Curtis .......................... 549/27 |
| 4,666,953 | A | * | 5/1987 | Klemarczyk et al. ......... 522/34 |
| 4,954,416 | A | | 9/1990 | Wright et al. |
| 5,100,987 | A | * | 3/1992 | Hatton et al. ................ 526/313 |
| 5,264,533 | A | * | 11/1993 | Rehmer et al. ............. 526/301 |
| 5,407,971 | A | * | 4/1995 | Everaerts et al. ............. 522/35 |
| 5,420,222 | A | * | 5/1995 | Stepp et al. .................. 528/31 |
| 5,427,862 | A | | 6/1995 | Ngo et al. |
| 5,446,073 | A | * | 8/1995 | Jonsson et al. ............. 522/104 |
| 5,527,925 | A | | 6/1996 | Chabrecek et al. |
| 5,536,759 | A | * | 7/1996 | Ramharack et al. .......... 522/35 |
| 5,550,171 | A | * | 8/1996 | Kuczynski ................... 522/31 |
| 5,569,686 | A | * | 10/1996 | Makati et al. .............. 523/409 |
| 5,612,391 | A | | 3/1997 | Chabrecek et al. |
| 5,621,018 | A | | 4/1997 | Chabrecek et al. |
| 5,629,355 | A | * | 5/1997 | Kuczynski ................... 522/31 |
| 5,744,512 | A | * | 4/1998 | Kohler et al. ................. 522/34 |
| 5,776,658 | A | * | 7/1998 | Niesert et al. ........... 430/281.1 |
| 5,837,746 | A | * | 11/1998 | Kohler et al. ................. 522/8 |
| 6,011,077 | A | | 1/2000 | Muller |
| 6,025,409 | A | * | 2/2000 | Jansen ........................ 522/107 |
| 6,034,150 | A | * | 3/2000 | Hoyle et al. .................. 522/63 |
| 6,153,662 | A | * | 11/2000 | Miller et al. .................. 522/63 |
| 6,294,591 | B1 | * | 9/2001 | Blum et al. ................... 522/35 |
| 6,369,124 | B1 | * | 4/2002 | Hoyle et al. .................. 522/63 |
| 6,410,611 | B1 | * | 6/2002 | Sakurai et al. .............. 522/103 |
| 6,448,301 | B1 | * | 9/2002 | Gaddam et al. ............... 522/6 |

* cited by examiner

*Primary Examiner*—James J. Seidleck
*Assistant Examiner*—Sanza L. McClendon
(74) *Attorney, Agent, or Firm*—Sughrue Mion, PLLC

(57) ABSTRACT

There is provided a radiation-curable coating composition containing oligomers that each have two end groups $X^1$ and $X^2$, wherein the end groups $X^1$ and $X^2$, which may be the same or different, are a photoinitiator group or an adhesion promoter group. The coating composition may exclude the presence of non-reactive photoinitiator groups and non-reactive adhesion promoter groups, each of which would fail to covalently bond itself to an oligomer backbone.

17 Claims, No Drawings

RADIATION-CURABLE COATING COMPOSITION INCLUDING OLIGOMERIC PHOTOINITIATOR AND/OR OLIGOMERIC ADHESION PROMOTER

BACKGROUND

The invention relates to an optical fiber coating composition. In particular, the invention relates to a radiation-curable primary or secondary optical fiber coating composition comprising oligomers endcapped on each end with either a photoinitiator group or an adhesion promoter group, and/or oligomers endcapped on one end with a photoinitiator group and endcapped on the other end with an adhesion promoter group.

Optical fibers made from drawn glass have been used as a reliable transmission medium in telecommunications cables. Glass optical fibers are employed because they have the ability to carry large amounts of information over long distances.

To facilitate these long-distance transmissions, optical fiber waveguides have been coated with plastic compositions of various materials in order to protect the fiber. Optical glass fibers are often coated with two superposed coatings. The coating which contacts the glass is a relatively soft, primary coating that must satisfactorily adhere to the fiber and be soft enough to resist microbending, especially at low service temperatures. The outer, exposed coating is a much harder secondary coating, and it provides resistance to handling forces, while possessing sufficient flexibility to enable the coated fiber to withstand repeated bending without cracking the coating.

Optical fiber coating compositions, whether primary coating compositions, single coating compositions, or secondary coating compositions, typically comprise, prior to being cured, one or more oligomers, photoinitiator(s) or a photoinitiator system, adhesion promoter(s), and reactive diluent (s). Optical fiber coating compositions also typically comprise flow control additive(s), antioxidant(s), and stabilizer (s).

The coating composition is applied to the optical glass fiber in a liquid state, and is thereafter exposed to actinic radiation to effect cure. Specifically, coatings are applied to the fiber in-line during fiber drawing. As the state of fiber drawing technology has allowed for increased draw speeds to effectuate longer optical fibers, however, the need for coating compositions that can cure at faster rates coincident with the faster draw speeds has become more urgent. Thus, as draw speeds have increased, a need has developed for materials that cure at faster rates than is presently available with current technology.

One method of effecting photopolymerization, and thereby curing the coating composition, is to create free radicals. It is known that a photoinitiator(s) or photoinitiator system may be included in a coating composition in order to generate free radicals upon the absorption of light, e.g. ultraviolet light. When the photoinitiator molecule absorbs radiation, electrons are promoted to higher energy levels in the molecule and the molecule becomes unstable, i.e. very reactive. So, for example, a photoinitiator molecule becomes electronically excited upon the absorption of light and undergoes alpha-cleavage to form two free radicals. One or both of these free radicals are capable of initiating polymerization. Other more complicated processes employ photoinitiator systems, which include co-initiators, from which a photoinitiator molecule may abstract a hydrogen (electron) to form a radical pair. Amines are typical co-initiators.

Although the prior art discloses various curable coating compositions with photoinitiators or a photoinitiator system dissolved therein, the effectiveness of the photoinitiators has not always been maximized. For example, problems sometimes exist with initiating the cure. In addition, free residual photoinitiator has a tendency to leach from the cured composition, thereby deteriorating the coating. Still further, photoinitiators may sometimes remain as low molecular weight inclusions in the cured polymer, thereby reducing the maximum physical properties obtainable in the cured system by adversely affecting properties such as hardness, abrasion resistance, etc.

A similar problem exists for the inclusion of one or more adhesion promoters in a coating composition. In the case of primary coating compositions, it is important that the cured coating adhere well to the glass cladding. Otherwise, the cured coating will have a tendency to delaminate from the glass fiber. Although the prior art discloses various curable coating compositions with adhesion promoters dissolved therein, their effectiveness has not always been maximized. Thus, a need still exists for adhesion promoters that provide even stronger adhesion to glass at relatively low concentrations.

SUMMARY

There is provided a radiation-curable coating composition comprising oligomers that each have two end groups $X^1$ and $X^2$, wherein the end groups $X^1$ and $X^2$, which may be the same or different, are selected from the group consisting of a photoinitiator group and an adhesion promoter group.

An oligomer according to the present invention having a photoinitiator group as at least one of the end groups $X^1$ and $X^2$ is an oligomeric photoinitiator that generates free radicals upon exposure to a sufficient amount of actinic radiation. An oligomer according to the present invention having an adhesion promoter group as at least one of the end groups $X^1$ and $X^2$ is an oligomeric adhesion promoter that, when present in a radiation-curable coating composition, provides the coating composition with strong adhesion to glass. A particular oligomer of the present radiation-curable coating composition having, for example, a photoinitiating group $X^1$ and an adhesion promoter group $X^2$, i.e. a particular oligomer for which $X^1$ and $X^2$ are not the same, may be referred to as an oligomeric photoinitiator/adhesion promoter.

DETAILED DESCRIPTION

The present invention provides oligomers endcapped on each end with either a photoinitiator group or an adhesion promoter group, and/or oligomers endcapped on one end with a photoinitiator group and end-capped on the other end with an adhesion promoter group. These oligomers are especially suited for use as photoinitiator and/or adhesion promoter inputs, i.e. as additives, in either a primary or secondary radiation-curable optical fiber coating composition.

For this invention, a polyfunctional compound is intended to mean a compound having 2 or more functionalities. An isocyanate-reactive compound is defined as a compound that is capable of reacting with an isocyanate, for example, a compound that is hydroxy-, thiol-, or amino-functionalized. The expression (meth)acrylate denotes groups which are either acrylates or methacrylates.

The term "primary coating" is defined as that coating which directly contacts the glass portion of the optical fiber. The uncured primary coating should be liquid at room temperature. The uncured primary coating should have a viscosity suitable for high speed processing, and the uncured primary coating should have a high cure speed. The cured primary coating should exhibit good adhesion to glass to prevent premature delamination of the coating from the glass portion of the optical fiber. The cured primary coating should have a low modulus at lower temperatures to minimize the effects of microbend attenuation due to small stresses on the optical fiber itself.

The term "secondary coating" is defined as the coating which covers the primary coating on the optical fiber. The cured secondary coating should have sufficient modulus to give impact resistance and to provide a protective barrier, and give tensile strength to the optical fiber. The cured secondary coating should exhibit little physical change over a wide temperature range, good resistance to water and solvent absorption and have good color stability.

The uncured liquid primary or secondary coating composition should have a sufficiently low viscosity that the composition will be easily applied to form a continuous protective coating on the glass fibers. Examples of such viscosities include from about 10,000 to about 100,000 mPa s (45–50° C.), e.g., from about 20,000 to about 80,000 mPa s (45–50° C.). There is no particular limitation on viscosity, however, and it may be adjusted to a given application by known methods. For example, viscosity may be adjusted depending on the type of optical fiber material being formulated and the method of application.

Generally, the thickness of the cured primary or secondary coating will depend on the intended use of the optical fiber, although thicknesses of about 20 to 35 microns, and in particular thicknesses of about 25 to 30 microns, are suitable.

When used as primary coatings, cured coatings in accordance with the present invention may have a glass transition temperature ($T_g$) of from about −60° C. to about −10° C., for example, from about −50° C. to about −30° C., and, e.g., about −40° C., and a low modulus of elasticity of from about 0.5 MPa to about 3.0 MPa at room temperature (20° C.) and 50% relative humidity, for example, from about 1.0 MPa to about 2.0 MPa and, e.g., about 1.5 MPa.

When utilized as a secondary coating, cured coatings in accordance with the present invention may have a glass transition temperature ($T_g$) of from about 35 C. to about 55° C., for example, about 45° C. A cured secondary coating usually has a modulus of elasticity of from about 30 to about 60 MPa at around 80° C. and 50% relative humidity, for example, from about 35 to about 55 MPa, and, e.g., about 45 MPa.

The oligomeric photoinitiators, oligomeric adhesion promoters, and oligomeric photoinitiators/adhesion promoters may each independently comprise (i) a backbone containing one or more types of repeating groups, (ii) two linking groups, and (iii) two end groups $X^1$ and $X^2$. The repeating group(s) of the oligomeric backbone may provide the oligomer with suitable mechanical properties upon cure. The linking groups, which may be the same or different, may (a) link the backbone to the end groups, or (b) link repeating groups of the backbone to themselves. The end groups $X^1$ and $X^2$, which may be the same or different, are independently selected from the group consisting of a photoinitiator group and an adhesion promoter group, and provide a photoinitiating functionality and an adhesion-promoting functionality, respectively.

The oligomeric photoinitiators, oligomeric adhesion promoters, and oligomeric photoinitiators/adhesion promoters may be prepared together in a single, one-pot synthesis. Alternatively, the oligomeric photoinitiators and the oligomeric adhesion promoters may be separately prepared. Either way, upon completing the preparation of the oligomeric photoinitiators, oligomeric adhesion promoters, and/or oligomeric photoinitiators/adhesion promoters, as determined by monitoring the disappearance of free linking group precursors, the oligomeric photoinitiators, oligomeric adhesion promoters, and/or oligomeric photoinitiators/adhesion promoters may be added to a radiation-curable coating composition.

Each individual oligomeric photoinitiator, or each individual oligomeric adhesion promoter, or each individual oligomeric photoinitiator/adhesion promoter, may comprise the three basic components (backbone, linking, and end group) discussed above, and may be independently represented by a structure such as, for example:

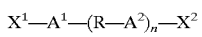

$$X^1\text{—}A^1\text{—}(R\text{—}A^2)_n\text{—}X^2$$

wherein $X^1$ and $X^2$ are the end groups, which may be the same or different, $A^1$ and $A^2$ are linking groups, which may be the same or different, R is a backbone group, and $n \geq 1$. On average, n is from about 2 to about 50, for example from about 2 to about 25, e.g. from about 2 to about 5.

In one embodiment, the oligomeric photoinitiator, oligomeric adhesion promoter, or oligomeric photoinitiator/adhesion promoter is prepared from, for example, (i) at least one ingredient which reacts to provide the backbone group R, (ii) at least one ingredient which reacts to provide the linking groups $A^1$ and $A^2$, and (iii) at least one ingredient which reacts to provide the end groups $X^1$ and $X^2$.

The linking groups $A^1$ and $A^2$ may include urethane, thiourethane, or urea groups which are formed by the reaction of hydroxyl, thiol, and amino groups, respectively, with a difunctional isocyanate. For example, a urethane linking group may be formed by the reaction of a difunctional isocyanate with an hydroxy functionalized compound. Other examples of linking groups may include carbonate, ether, and ester groups. Urethane, thiourethane, or urea linking groups, and especially urethane linking groups, are particularly suitable for use in the present invention.

In the case where the linking groups $A^1$ and $A^2$ are both urethane linking groups, the oligomeric photoinitiator, oligomeric adhesion promoter, or oligomeric photoinitiator/adhesion promoter may be prepared from, for example, (i) at least one dihydroxy functionalized compound that reacts to provide the backbone group R, (ii) at least one diisocyanate, and (iii) at least one hydroxy-, thiol-, amino-, or isocyano-functionalized compound that reacts to provide the end groups $X^1$ and $X^2$.

Using as an example the particular case of a urethane linking group that is formed by the reaction of (i) a hydroxyl-functionalized compound ($COMP_1$—OH) with one end of a diisocyanate (OCN—$COMP_3$—NCO), and (ii) a second hydroxyl-functionalized compound ($COMP_2$—OH) with the second end of the same diisocyanate, it will be readily understood by one of ordinary skill in the art that the term urethane linking group is intended to encompass the —U—$COMP_3$—U— portion of the $COMP_1$—U—$COMP_3$—U—$COMP_2$ reaction product, wherein U is the urethane moiety —O—(C=O)—NH. For example, when the diisocyanate is isophorone diisocyanate, 13 $COMP_3$— is the isophorone residue of isophorone diisocyanate.

An example of the (i) at least one dihydroxy compound that reacts to provide the backbone group R is a diol, that may be represented by a structure such as, for example, HO—R—OH. The diol may have a number average molecular weight of from about 50 to about 5,000, e.g. from about 50 to about 1,000. Examples of representative diols include polyether diol, polyester diol, polycarbonate diol, and hydrocarbon diol. It will be readily understood by one skilled in the art that a polyether diol will react to provide a polyether-backboned oligomer, a polyester diol will react to provide a polyester-backboned oligomer, etc., or that the use of mixtures of diols, such as a mixture of polyether and polyester diol will provide a polyether/polyester-backboned oligomer.

Polyether diols may be homopolymers or copolymers of alkylene oxides including $C_2$ to $C_5$ alkylene oxides, such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$ to $C_{40}$ diols, such as 12-hydroxystearyl alcohol and hydrogenated dimerdiol; and adducts of the above alkylene oxides with bisphenol-A or hydrogenated bisphenol-A.

Polyester diols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$ to $C_{40}$ aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, epsilon-caprolactone, delta-valerolactone, and beta-methyl-delta-valerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, phthalic acid, isophthalic acid, and terephthalic acid.

Polycarbonate diols may be, for example, polycarbonate diols which are obtainable by a reaction of a short chain dialkylcarbonate and a component selected from aforementioned polyether diols, polyester diols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis-(hydroxymethyl) cyclohexane. The short chain dialkylcarbonate may be $C_1$–$C_4$ alkylcarbonates such as, for example, dimethylcarbonate and diethylcarbonate.

Hydrocarbon diols, which may be generally defined as low molecular weight alkane diols having a molecular weight of from about 50 to about 500, may be used as the at least one ingredient that reacts to provide the backbone group R. Examples of hydrocarbon diols include ethylene glycol, propylene glycol, tripropylene glycol, 1,3-or 1,4-butanediol, neopentyl glycol, 1,6-hexanediol, 1,9-nonanediol, and 1,10-decanediol. Higher fatty acid diols and higher hydrocarbon diols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol, 1,21-henicosanediol, chimyl alcohol, batyl alcohol, selachyl alcohol, and dimeric acid diol may also be used.

When using a low molecular weight alkane diol as the dihydroxy compound that reacts to provide the backbone group R, then each individual oligomeric photoinitiator, or each individual oligomeric adhesion promoter, or each individual oligomeric photoinitiator/adhesion promoter may be independently represented by a structure such as, for example:

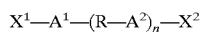

wherein n, on average, is from about 10 to about 50.

If a diol is used as the compound that reacts to provide the backbone group R, it may be added in amounts of from about 25 wt % to about 85 wt % to the preparation of the oligomeric photoinitiators, oligomeric adhesion promoters, and/or oligomeric photoinitiators/adhesion promoters, based upon the total weight of all components employed in the preparation of the oligomeric photoinitiators, oligomeric adhesion promoters, and/or oligomeric photoinitiators/ adhesion promoters.

Examples of the (ii) at least one diisocyanate include aromatic diisocyanates, aromatic aliphatic diisocyanates, alicyclic diisocyanates, or aliphatic diisocyanates.

Examples of the aromatic diisocyanates include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate.

Examples of the aromatic aliphatic diisocyanates include diisocyanates such as 1,3- or 1,4-xylylene diisocyanate or mixtures thereof and 1,3- or 1,4-bis(1-isocyanate-1-methylethyl)benzene or mixtures thereof.

Examples of the alicyclic diisocyanates include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate or IPDI), 4,4'-methylenebis (cyclohexyl isocyanate), methyl-2,4-cyclohexane diisocyanate, methyl-2,6-cyclohexane diisocyanate, and 1,3- or 1,4-bis (isocyanatemethyl)cyclohexane.

Examples of the aliphatic diisocyanates include diisocyanates such as trimethylene diisocyatnate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatemethylcaproate.

The majority of the isocyanate compounds mentioned above are available from Bayer of Pittsburgh, Pa.

A diisocyanate may be added in amounts of from about 5 wt % to about 50 wt % to the preparation of the oligomeric photoinitiators, oligomeric adhesion promoters, and/or oligomeric photoinitiators/adhesion promoters, based upon the total weight of all components employed in the preparation of the oligomeric photoinitiators, oligomeric adhesion promoters, and/or oligomeric photoinitiators/adhesion promoters.

Examples of the (iii) at least one hydroxy-, thiol-, amino-, or isocyano-functionalized compound that reacts to provide the end groups $X^1$ and $X^2$ include (a) an hydroxyl-, thiol-, or amino-functionalized photoinitiator, i.e. an isocyanate-reactive photoinitiator and (b) an hydroxy-, thiol-, amino-, or isocyano-functionalized adhesion promoter.

The chemical nature of the photoinitiator that reacts to provide the photoinitiator end group is not narrowly limited, provided that it has a functional component that may react to form the linking group A, and thereby covalently bond the remainder of the photoinitiator group, i.e. the photoinitiating component of the photoinitiator group, to the present oligomeric backbone. For example, isocyanate-reactive photoinitiators (a) include benzoin, 1-hydroxycyclohexyl phenyl ketone (IRGACURE 184), 2-hydroxy-2-methyl-1-phenyl propan-1-one (DAROCUR 1173), 1-{4-(2-hydroxyethoxy)phenyl}-2-hydroxy-2-methylpropan-1-one (IRGACURE 2959), and 2-hydroxythioxanthen-9-one (available from ChemFirst Fine Chemical of Pascagoula, Miss.). DAROCUR and IRGACURE product lines are available from Ciba Additives of Tarrytown, N.Y.

In the general structure $X^1—A^1—(R—A^2)_n X^2$, R is a backbone group and $A^1$ and $A^2$ are linking groups, but it will be readily understood by one of ordinary skill in the art that the present oligomeric backbone is considered to encompass the entire $—A^1—(R—A^2)—$ structure when n is 1, and the entire $—A^1—R—A^2—(R—A^2)_{n-1}—$ structure when n is greater than 1. It is with this understanding that a photoinitiator group or adhesion promoter group is said to be covalently bonded to an oligomeric backbone.

In the case of IRGACURE 2959, which is dihydroxy-functionalized, one of the hydroxyl groups is a primary OH, whereas the other hydroxyl group is a tertiary OH. Because the reactivity of the primary OH dwarfs the reactivity of the tertiary OH, it is considered that the amount of IRGACURE 2959 reacting via the tertiary OH group is negligible, i.e. virtually nil.

A photoinitiator that does not initially contain the necessary functional component to covalently bond itself to an oligomeric backbone through the formation of a linking group A may be separately prepared prior to its addition to the preparation of the present oligomeric photoinitiators and/or oligomeric adhesion promoters by chemically inserting, for example, an isocyanate-reactive functionality onto a photoinitiator which lacks such a functionality. For example, a photoinitiator may be brominated in free-radical bromination with a subsequent Williamson synthesis of the brominated product and a diol.

Examples of photoinitiators which may be chemically converted to isocyanate-reactive photoinitiators include acyl phosphine oxide photoinitiators, such as benzoyl diaryl phosphine oxide photoinitiators. Examples of benzoyl diaryl phosphine oxide photoinitiators include: bis(2,4,6-trimethylbenzoyl)phenylphosphine oxide (IRGACURE 819), (2,4,6-trimethylbenzoyl)diphenylphosphine oxide (LUCERIN TPO, which is available from BASF of Parsippany, N.J.); bis(2,6-dimethoxybenzoyl)-2,4,4-trimethylpentylphosphine oxide, which is a first component (25 wt %) of IRGACURE 1700. The second component (75 wt %) of IRGACURE 1700 is 2-hydroxy-2-methyl-1-phenylpropan-1-one.

A suitable isocyanate-reactive photoinitiator may be represented by one of the following general structural formulas (1) and (2).

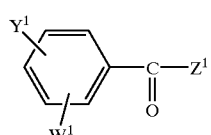

(1)

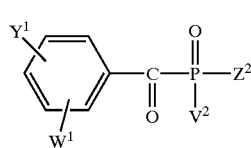

(2)

In formulas (1) and (2), $Y^1$, $Z^1$, $Y^2$, $Z^2$, and $V^2$ may be independently selected from the group of substituents consisting of alkyl and aromatic substituents. Each of substituents $Y^1$, $Z^1$, $Y^2$, $Z^2$, and $V^2$ may have it own substituent(s). $W^1$ and $W^2$ represent the hydroxy-, thiol-, or amino-functionalized component of the isocyanate-reactive photoinitiator that reacts to form the linking group A, and thereby covalently bonds the remainder of the photoinitiator group, i.e. the photoinitiating component of the photoinitiator group, to the oligomeric backbone. For example, $W^1$ and $W^2$ may themselves be a hydroxyl group, a thiol group, or an amino (primary or secondary) group, or $W^1$ and $W^2$ may be a substituent group, such as an alkyl or aromatic substituent group, that is itself substituted with a hydroxyl group, a thiol group, or an amino (primary or secondary) group to provide isocyanate-reactive functionality.

In certain embodiments of the invention, it may be desirable to employ an isocyanate-reactive photoinitiator that benefits from the presence of a co-initiator, from which the photoinitiator may abstract a hydrogen (electron) to form a radical pair. Amines are typical co-initiators. An example of a photoinitiator that benefits from the presence of a co-initiator is 3-hydroxybenzophenone. 2-hydroxythioxanthen-9-one is another example of a photoinitiator that benefits from the presence of a co-initiator, although in the case of 2-hydroxythioxanthen-9-one, a co-initiator is not necessary.

An isocyanate-reactive photoinitiator that may benefit from the presence of a co-initiator may be represented by the following general structural formula (3).

(3)

In structural formula (3), one of $Z^3$ and $V^3$ is selected from the group of substituents consisting of alkyl and aromatic substituents, wherein each substituent may have its own substituent(s), and one of $Z^3$ and $V^3$ represents the hydroxy-, thiol-, or amino-functionalized component of the isocyanate-reactive photoinitiator that reacts to form the linking group A, and thereby covalently bonds the remainder of the photoinitiator group, i.e. the photoinitiating component of the photoinitiator group, to the oligomeric backbone. In other words, one of $Z^3$ and $V^3$ may be a hydroxyl group, a thiol group, or an amino (primary or secondary) group, or one of $Z^3$ and $V^3$ may be a substituent group, such as an alkyl or aromatic substituent group, that is itself substituted with a hydroxyl group, a thiol group, or an amino (primary or secondary) group to provide isocyanate-reactive functionality.

The co-initiator may be added to the coating composition, or the co-initiator may be covalently bonded to an oligomeric backbone and then added to the coating composition, i.e. the co-initiator may itself be an oligomeric additive to the present radiation-curable coating composition. Therefore, it will be readily understood by one of ordinary skill in the art that the co-initiator may be a functionalized co-initiator that is able to react to form a linking group A, and thereby covalently bond the remainder of the co-initiator group to an oligomeric backbone, i.e. the co-initiator may be, for example, an isocyanate-reactive co-initiator.

Thus, in the case where oligomeric photoinitiators are being prepared with one or both of $X^1$ and $X^2$ equal to a photoinitiating end group that benefits from the presence of a co-initiator, an effective amount of oligomeric co-initiators having one or both of $X^1$ and $X^2$ equal to a co-initiator end group may also be included. If both end groups $X^1$ and $X^2$ are not co-initiator, then the end group may be selected from the group consisting of a photoinitiator group and an adhesion promoter group. Alternatively, where oligomeric photoinitiators are being prepared with one or both of $X^1$ and $X^2$ equal to a photoinitiator group that benefits from the presence of a co-initiator, an effective amount of co-initiator may be added to the coating composition without first bonding the co-initiator to an oligomer backbone. The amount of co-initiator to be added will directly depend on the amount of photoinitiator that is added that benefits from the presence of co-initiator.

Furthermore, it should be noted that it is possible to employ an isocyano-functionalized photoinitiator instead of the isocyanate-reactive photoinitiators mentioned above. In the case of an isocyano-functionalized photoinitiator, the backbone group R, the linking group A, and one end group X may be provided by the reaction of an isocyano-functionalized photoinitiator with, for example, a diol of the formula HO—R—OH. The reaction of the cyano moiety (N=C=O) of the photoinitiator with the hydroxyl moiety of the diol will provide a photoinitiator end group X linked to the backbone group R via the urethane linking group A.

A coating composition that cures in a very efficient manner may be provided by preparing a radiation-curable coating composition that includes oligomers having at least one end capped with a photoinitiator group. Specifically, photoinitiator may be added during the preparation of oligomeric photoinitiator(s) so that the photoinitiator group covalently bonded to an oligomer backbone represents from about 1 wt % to about 10 wt % of the final radiation-curable coating composition, based on the total weight of the radiation-curable coating composition, without taking into account that portion of the weight of the oligomer corresponding to portions of the oligomeric photoinitiator other than the photoinitiator group.

The chemical nature of the adhesion promoter that reacts to provide the adhesion promoter end group is not narrowly limited, provided that it has a functional component that may react to form the linking group A, and thereby covalently bond the remainder of the adhesion promoter group, i.e. the adhesion promoting component of the adhesion promoter group, to the present oligomeric backbone. Examples of the hydroxy-, thiol-, amino-, or isocyano-functionalized adhesion promoter include hydroxy-, thiol-, amino-, or isocyano-functionalized alkoxysilanes, especially hydroxy-, thiol-, amino-, or isocyano-functionalized dialkoxysilanes and hydroxy-, thiol-, amino-, or isocyano-functionalized trialkoxysilanes. Specific examples of the hydroxy-, thiol-, amino-, or isocyano-functionalized adhesion promoter include any of the di- or tri-alkoxysilanes such as N-beta (aminoethyl)-gamma-aminopropylmethyldimethoxysilane, N-beta(aminoethyl)-gamma-aminopropyltrimethoxysilane, and isocyanopropyltriethoxysilane.

In the case of an isocyano-functionalized adhesion promoter, such as isocyanopropyltriethoxysilane, the backbone group R, the linking group A, and one end group may be provided by the reaction of, for example, isocyanopropyltriethoxysilane with a diol of the formula HO—R—OH. The reaction of the cyano moiety (N=C=O) of the adhesion promoter with the hydroxyl moiety of the diol will provide an adhesion promoter end group linked to the backbone group R via the urethane linking group A.

As mentioned above, the primary coating is the coating that directly contacts the glass portion of the optical fiber. Therefore, oligomeric adhesion promoter will generally only be included in the preparation of a primary coating composition.

A primary coating composition having a very strong adhesion to glass may be provided by preparing a radiation-curable coating composition that includes oligomers having at least one end capped with an adhesion promoter group. Specifically, adhesion promoter may be added during the preparation of oligomeric adhesion promoter so that the adhesion promoter group covalently bonded to the oligomer backbone represents from about 0.5 wt % to about 5 wt % of the final radiation-curable coating composition, based on the total weight of the radiation-curable coating composition, without taking into account that portion of the weight of the oligomer corresponding to portions of the oligomeric adhesion promoter other than the adhesion promoter group. For secondary coating compositions, the adhesion promoter group may represent 0 wt % of the final radiation-curable coating composition.

Using as an example the situation where the reactants for preparing the oligomeric photoinitiators, oligomeric adhesion promoters, and/or oligomeric photoinitiators/adhesion promoters include backbone group-providing diols, linking group-providing diisocyanates, and end group-providing hydroxy-functionalized radiation-curable components, the oligomeric photoinitiators, oligomeric adhesion promoters, and/or oligomeric photoinitiators/adhesion promoters may be prepared together in a single, one-pot synthesis, so that the concentration of all N=C=O groups is equal to the concentration of all OH groups. This relationship may be generalized for any suitable reactants for preparing the oligomeric photoinitiators, oligomeric adhesion promoters, and/or oligomeric photoinitiators/adhesion promoters by maintaining the concentration of all N=C=O equivalents equal to the concentration of all OH equivalents.

Upon completing the preparation of the oligomeric photoinitiators, oligomeric adhesion promoters, and/or oligomeric photoinitiators/adhesion promoters, as determined by monitoring the disappearance of free linking group precursors, e.g. free N=C=O groups, the oligomeric photoinitiators, oligomeric adhesion promoters, and/or oligomeric photoinitiators/adhesion promoters may be added to a radiation-curable coating composition.

In addition to the oligomeric photoinitiator and/or oligomeric adhesion promoter, the radiation-curable coating composition may comprise a radiation curable oligomer, for example, a urethane acrylate oligomer. The oligomer may be synthesized by methods known in the art or purchased commercially.

A urethane acrylate oligomer may be formed by reacting a polyol, for example a diol, with a multi-functional isocyanate, for example a diisocyanate, and then end-capping with a hydroxy-functional acrylate.

Any of the polyols and isocyanates mentioned above may be used as the polyol and isocyanate for the preparation of the urethane acrylate oligomer.

The hydroxy-functional acrylate may be, for example, caprolactone acrylate (available as SR495 from Sartomer of Exton, Pa.), 2-hydroxyethyl (meth)acrylate, 2-hydroxypropyl (meth)acrylate, 2-hydroxybutyl (meth) acrylate, 4-hydroxybutyl (meth)acrylate, pentanediol mono (meth)acrylate, 2-hydroxy-3-phenyloxypropyl (meth) acrylate, 2-hydroxyalkyl(meth)acryloyl phosphate, 4-bydroxycyclohexyl (meth)acrylate, cyclohexanedimethanol mono(meth)acrylate, neopentyl glycol mono(meth) acrylate, trimethylolpropane di(meth)acrylate, and pentaerythritol tri(meth)acrylate. Additional examples include compounds which are obtainable by an addition reaction of a glycidyl group-containing compound and a (meth)acrylic acid, such as alkyl glycidyl ether and glycidyl (meth)

acrylate. The above hydroxyl group-containing (meth) acrylates may be used alone or in combination of two or more.

Polyether-based, aliphatic urethane acrylate compounds are available from UCB Chemical Corp. They are sold under the name Ebecryl, and include Ebecryl 230. Polyester-based, aliphatic urethane acrylate oligomers are available from Sartomer or from Henkel (Ambler, Pa.). They are sold under the name CN966xxx, including CN966J75, and Photomer, including Photomer 6010 and 6019, respectively.

The molecular weight range of the urethane acrylate oligomer may vary from 800 to 15,000 based upon the specific requirements for properties of the primary or secondary coating.

The radiation-curable coating composition may comprise minor amounts of additives, such as reactive diluent(s), antioxidant(s), flow control agent(s), stabilizer(s), lubricant(s) and wetting agent(s). The term "minor amount" is intended to mean less than 5 percent by weight, for example, less than 3 percent by weight, e.g. less than 1 percent by weight. At these low levels, the amount of each of the foregoing additives present in the coating composition may be said to be equal to the level of impurities found in commercially available raw materials.

A single reactive diluent or mixture of reactive diluents may be included in the coating composition. The use of the reactive diluent(s) allows the formulator to adjust the viscosity of the solution to improve processability if necessary.

The reactive diluent(s) may, for example, be a lower molecular weight, liquid acrylate-functional compound including the following diacrylates and monofunctional acrylates: tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, tetraethylene glycol dimethacrylate, 1,3-butylene glycol diacrylate, tetraethylene glycol diacrylate, triisopropylene glycol diacrylate, triisopropylene glycol diacrylate, ethoxylated bisphenol-A diacrylate, and isobornyl acrylate. Another example of a reactive diluent is N-vinyl-2-pyrrolidone. In addition, N-vinyl caprolactam, which is a liquid at elevated temperatures, e.g. higher than 35° C., may serve as a reactive diluent.

The present coating composition does not require the addition of separate photoinitiator apart from the oligomeric photoinitiator of the present invention, i.e. the coating composition does not contain photoinitiator that is not covalently bonded to an oligomer backbone. Furthermore, coating compositions according to the present invention do not require the addition of separate adhesion promoter apart from the oligomeric adhesion promoter of the present invention, i.e. the coating composition does not contain adhesion promoter that is not covalently bonded to an oligomer backbone. In other words, the present coating composition may exclude the presence of non-reactive photoinitiator groups and non-reactive adhesion promoter groups, each of which would fail to covalently bond itself to an oligomer backbone.

The present radiation curable coating compositions may be free of non-reactive diluents, such as water or organic solvents, which lack ethylenic unsaturation.

The foregoing coating components may be mixed or blended together using any known equipment and an optical fiber may be coated with the coating composition by any known optical fiber production technique.

The techniques may involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness. Monitoring and measuring devices may be provided near each station to ensure that the coating applied at that station is coated concentrically and to the desired diameter. Examples of optical fiber coating techniques that may be utilized in the present invention include the methods disclosed in U.S. Pat. Nos. 4,512,281, 4,531,959, 4,539,219, 4,792,347, and 4,867,775.

What is claimed is:

1. A radiation-curable coating composition for optical fibers comprising oligomers that each have two end groups $X^1$ and $X^2$, wherein the end groups $X^1$ and $X^2$, which may be the same or different, are selected from the group consisting of a photoinitiator group and an adhesion promoter group, wherein the oligomers are independently represented by the following structure:

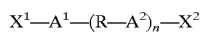

wherein $X^1$ and $X^2$ are the end groups, which may be the same or different, $A^1$ and $A^2$ are linking groups, which may be the same or different, R is a backbone group, and $n \geq 1$, and wherein the oligomers are each independently the reaction product of (i) at least one dihydroxy functionalized compound that reacts to provide the backbone group R, (ii) at least one diisocyanate, and (iii) at least one hydroxy-, thiol-, amino-, or isocyano-functionalized compound that reacts to provide the end groups $X^1$ and $X^2$.

2. The radiation-curable coating composition of claim 1, wherein n is from about 2 to about 25.

3. The radiation-curable coating composition of claim 1, wherein the at least one diisocyanate is selected from the group consisting of toluene diisocyanate and isophorone diisocyanate.

4. The radiation-curable coating composition of claim 1, wherein the at least one dihydroxy functionalized compound that reacts to provide the backbone group R is a diol selected from the group consisting of polyether diols, polyester diols, polycarbonate diols, hydrocarbon diols, and mixtures thereof.

5. The radiation-curable composition of claim 4, wherein the diol is a polyethylene-polypropylene glycol.

6. The radiation-curable coating composition of claim 1, wherein the linking groups $A^1$ and $A^2$ are urethane linking groups.

7. The radiation-curable coating composition of claim 1, wherein a photoinitiator reacts to provide the photoinitiator group, and the photoinitiator is selected from the group consisting of benzoin, 1-hydroxycyclohexyl phenyl ketone, 2-hydroxy-2-methyl-1-phenyl propan-1-one, 1-{4-(2-hydroxyethoxy)phenyl}-2-hydroxy-2-methylpropan-1-one, and 2-hydroxythioxanthen-9-one.

8. The radiation-curable coating composition of claim 1, wherein an adhesion promoter reacts to provide the adhesion promoter group, and the adhesion promoter is an hydroxy-, thiol-, amino-, or isocyano-functionalized dialkoxysilane or an hydroxy-, thiol-, amino-, or isocyano-functionalized trialkoxysilane.

9. The radiation-curable coating composition of claim 8, wherein the adhesion promoter is selected from the group consisting of N-beta(aminoethyl)-gamma-aminopropylmethyldimethoxysilane, N-beta(aminoethyl)-gamma-aminopropyltrimethoxysilane, and isocyanopropyltriethoxysilane.

10. The radiation-curable coating composition of claim 1, wherein the coating composition does not contain photoinitiator that is not covalently bonded to an oligomer backbone.

11. The radiation-curable coating composition of claim 1, wherein the coating composition does not contain adhesion promoter that is not covalently bonded to an oligomer backbone.

12. The radiation-curable coating composition of claim 1, wherein the coating composition further comprises radiation-curable oligomers.

13. The radiation-curable coating composition of claim 12, wherein the radiation-curable oligomers are urethane acrylate oligomers.

14. The radiation-curable coating composition of claim 1, wherein the coating composition comprises each of reactive diluent(s), antioxidant(s), flow control agent(s), sensitizer(s), stabilizer(s), lubricant(s) and wetting agent(s) in amounts of 5 wt % or less, based on the total weight of the coating composition.

15. The radiation-curable coating composition of claim 1, wherein the coating composition comprises each of reactive diluent(s), antioxidant(s), flow control agent(s), sensitizer(s), stabilizer(s), lubricant(s) and wetting agent(s) in amounts of 3 wt % or less, based on the total weight of the coating composition.

16. An optical fiber at least partially coated with a radiation-cured coating, wherein said radiation-cured coating is obtained by a process comprising radiation-curing a composition comprising oligomers that each have two end groups $X^1$ and $X^2$, wherein the end groups $X^1$ and $X^2$, which may be the same or different, are selected from the group consisting of a photoinitiator group and an adhesion promoter group.

17. The optical fiber of claim 16, wherein the radiation-cured coating is obtained by a process comprising radiation-curing a composition comprising oligomers that each have two end groups $X^1$ and $X^2$, wherein the end groups $X^1$ and $X^2$, which may be the same or different, are selected from the group consisting of a photoinitiator group and an adhesion promoter group, wherein the oligomers are independently represented by the following structure:

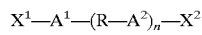

wherein $X^1$ and $X^2$ are the end groups, which may be the same or different, $A^1$ and $A^2$ are linking groups, which may be the same or different, R is a backbone group and $n \geq 1$, and wherein the oligomers are each independently the reaction product of (i) at least one dihydroxy functionalized compound that reacts to provide the backbone group R, (ii) at least one diisocyanate, and (iii) at least one hydroxy-, thiol-, amino-, or isocyano-functionalized compound that reacts to provide the end groups $X^1$ and $X^2$.

* * * * *